US011076045B2

(12) United States Patent
Riswadkar et al.

(10) Patent No.: US 11,076,045 B2
(45) Date of Patent: Jul. 27, 2021

(54) COMMUNICATION SESSION HOLD TIME MANAGEMENT IN A CONTACT CENTER

(71) Applicant: Avaya Inc., Santa Clara, CA (US)

(72) Inventors: Niraj Riswadkar, Pune (IN); Salil Dhawan, Pune (IN); Mayura Nene, Pune (IN)

(73) Assignee: Avaya Inc., Santa Clara, CA (US)

( * ) Notice: Subject to any disclaimer, the term of this patent is extended or adjusted under 35 U.S.C. 154(b) by 156 days.

(21) Appl. No.: 16/249,571

(22) Filed: Jan. 16, 2019

(65) Prior Publication Data

US 2020/0228655 A1    Jul. 16, 2020

(51) Int. Cl.
 *H04M 3/523* (2006.01)
 *H04M 3/51* (2006.01)
 *H04M 3/428* (2006.01)

(52) U.S. Cl.
 CPC ....... *H04M 3/5175* (2013.01); *H04M 3/4285* (2013.01); *H04M 3/5183* (2013.01); *H04M 3/5238* (2013.01); *H04M 2203/403* (2013.01); *H04M 2203/404* (2013.01)

(58) Field of Classification Search
 CPC ............. H04M 3/4285; H04M 3/5175; H04M 3/5238; H04M 2203/403
 USPC .................................................... 379/266.06
 See application file for complete search history.

(56) References Cited

U.S. PATENT DOCUMENTS

| | | | | |
|---|---|---|---|---|
| 7,046,789 | B1* | 5/2006 | Anderson | H04M 3/5175 379/265.01 |
| 8,108,237 | B2* | 1/2012 | Bourne | H04M 3/5175 705/7.13 |
| 8,175,254 | B2* | 5/2012 | Li | H04L 43/16 379/265.08 |
| 9,167,095 | B1* | 10/2015 | Selvin | H04M 3/5175 |
| 2005/0008141 | A1* | 1/2005 | Kortum | H04M 3/523 379/266.06 |
| 2006/0265090 | A1* | 11/2006 | Conway | H04M 3/5175 700/94 |
| 2016/0352903 | A1* | 12/2016 | Hp | H04M 3/48 |

OTHER PUBLICATIONS

U.S. Appl. No. 16/208,076, filed Dec. 3, 2018, Deole et al.

* cited by examiner

*Primary Examiner* — Ahmad F. Matar
*Assistant Examiner* — Jirapon Intavong
(74) *Attorney, Agent, or Firm* — Sheridan Ross P.C.

(57) ABSTRACT

A determination is made that a real-time communication session (e.g., a voice call) between a first agent terminal and a customer communication endpoint has been placed on hold by a first contact center agent. An estimated hold time for the real-time communication is determined, based on a rule, in response to determining that the real-time communication session has been placed on hold. It is determined that the estimated hold time for the real-time communication session has expired. In response to determining that the estimated hold time for the real-time communication session has expired, one or more actions occur. For example, the real-time communication session is automatically transferred to a second agent terminal.

20 Claims, 4 Drawing Sheets

COMMUNICATION SESSION HOLD TIME MANAGEMENT IN A CONTACT CENTER

FIELD

The disclosure relates generally to contact centers and particularly to managing communication session hold time in a contact center.

BACKGROUND

Currently, when a customer and a contact center agent are engaged in a communication session (e.g., a voice call), the contact center agent may place the communication session on hold. For example, the contact center agent may need to research a problem that the customer is currently experiencing. During this time, the customer is unaware of how long he/she may be on hold. If the contact center agent takes too long, the customer may become frustrated and even drop the communication session.

One solution, as described in U.S. patent application Ser. No. 16/208,076 entitled "AUTOMATIC ON HOLD COMMUNICATION SESSION STATE MANAGEMENT IN A CONTACT CENTER" is to notify a contact center agent that a maximum hold time is about to expire and then take the communication session of hold.

Another solution is to use a system wide hold recall timer. However, the current system wide hold recall timers are inflexible and cannot be applied to a class of service or class restriction.

SUMMARY

These and other needs are addressed by the various embodiments and configurations of the present disclosure. A determination is made that a real-time communication session (e.g., a voice call) between a first agent terminal and a customer communication endpoint has been placed on hold by a first contact center agent. An estimated hold time for the real-time communication is determined, based on a rule, in response to determining that the real-time communication session has been placed on hold. It is determined that the estimated hold time for the real-time communication session has expired. In response to determining that the estimated hold time for the real-time communication session has expired, at least one of the following actions occur: 1) the real-time communication session is automatically transferred to a second agent terminal; 2) a first message is sent to the first agent terminal to have the first contact center agent provide an estimated time before the first real-time communication session is taken of hold; 3) a second message is sent to the second agent terminal that notifies a second agent associated with the second agent terminal that the estimated hold time has expired; and 3) a training session is scheduled for the first contact center agent.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The term "real-time communication session" as described herein and in the claims apply to communication sessions that can be placed on hold, such as a voice communication session, a video communication session, an Instant Messaging (IM) communication session (e.g., a chat communication) and/or the like. As described herein a real-time communication session is not an email communication session, a text messaging communication session, a social media communication session, and/or the like.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
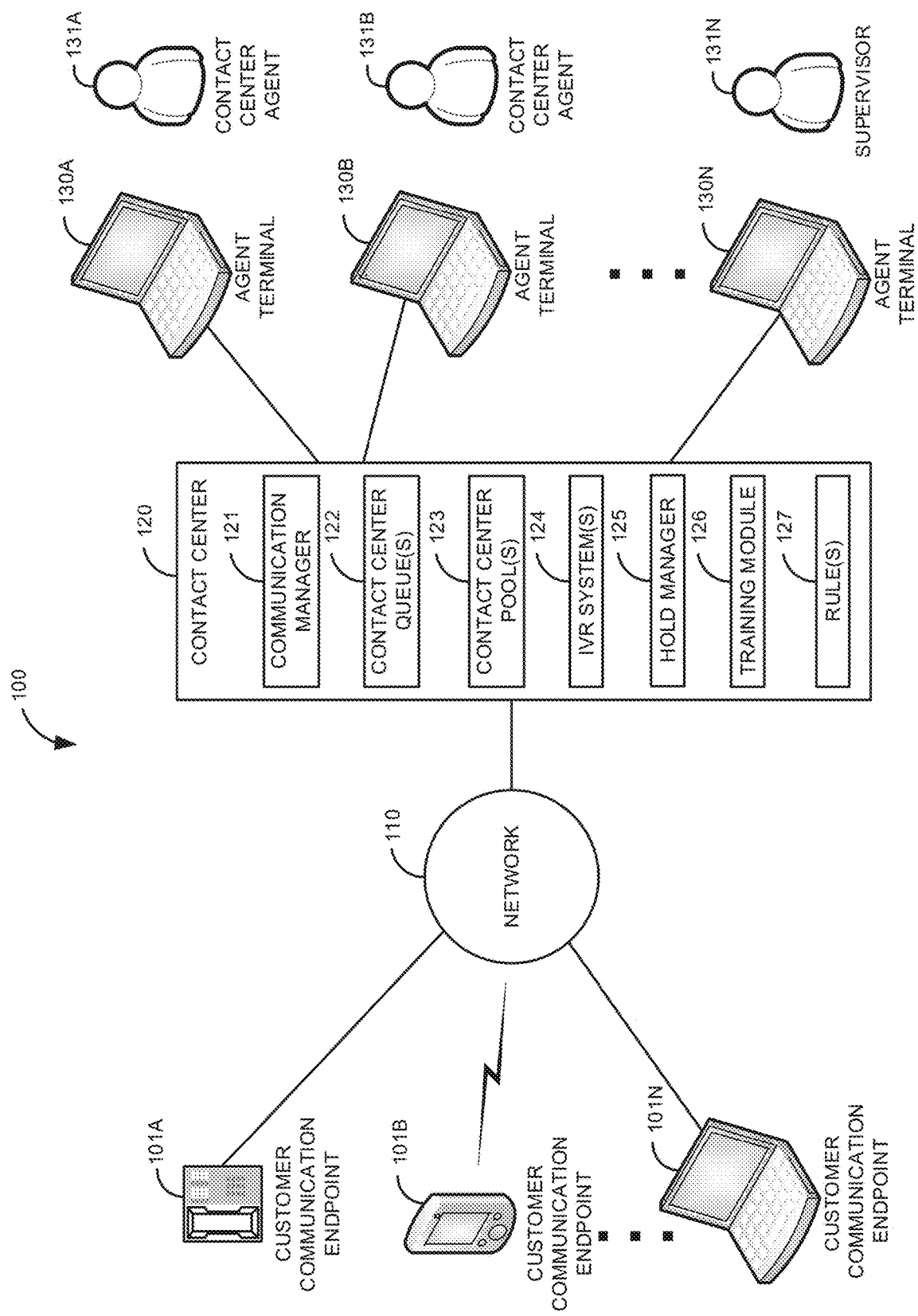
FIG. 1 is a block diagram of a first illustrative system for managing real-time communication session hold time in a contact center.

FIG. 1 is a block diagram of a first illustrative system 100 for managing real-time communication session hold time in a contact center 120. The first illustrative system 100 comprises customer communication endpoints 101A-101N, a network 110, a contact center 120, and agent terminals 130A-130N. In addition, contact center agents 131A-131B and a supervisor 131N (a type of contact center agent 131) are shown as being associated with the respective agent terminals 130A-130N.

The customer communication endpoints 101A-101N can be or may include any user communication endpoint device that can communicate on the network 110, such as a Personal Computer (PC), a telephone, a video system, a conferencing system, a cellular telephone, a Personal Digital Assistant (PDA), a tablet device, a notebook device, a smartphone, and/or the like. The customer communication endpoints 101A-101N are devices where a communication sessions ends. The customer communication endpoints 101A-101N are not network elements that facilitate and/or relay a communication session in the network 110, such as a communication manager 121 or router. As shown in FIG. 1, any number of customer communication endpoints 101A-101N may be connected to the network 110.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Integrated Services Digital Network (ISDN), video protocols, Instant Messaging (IM) protocols, and/or the like. Thus, the network 110 is an electronic communication network configured to carry messages via packets and/or circuit switched communications.

The contact center 120 can be or may include any hardware coupled with firmware/software that can be used to manage communication sessions between the customer communication endpoints 101A-101N and the agent terminals 130A-130N, such as, a Private Brach Exchange (PBX), a session manager, a switch, a proxy server, and/or the like. The contact center 120 further comprises a communication manager 121, contact center queue(s) 122, contact center pool(s) 123, Interactive Voice Response (IVR) system(s) 124, a hold manager 125, a training module 126, and rule(s) 127. In one embodiment, the contact center 120 may be distributed between multiple physical locations.

The communication manger 121 can be or may include any hardware coupled with firmware/software that can manage communication sessions in the contact center 120, such as a PBX, a session manager, a switch, a proxy server, and/or the like. The communication manager 121 may manage real-time communication sessions and non-real-time communication sessions.

The contact center queue(s) 122 can be or may include any computer construct for holding a communication session (real-time or non-real-time) until transferred to an agent terminal 130, a contact center pool 123, or the IVR system 124. The contact center queue(s) 122 may be specific to a product/service. The contact center queue(s) 122 may be based on an agent skill set/level. For example, a specific contact center queue 122 may be supported by contact center agents 131 that support a specific product. The contact center queue(s) 122 may hold communication sessions in various ways, such as in a first-in-first out basis.

The contact center pool(s) 123 can be or may include any computer construct that can hold communication sessions until selected by a contact center agent 131. The contact center pool(s) 123 do not queue communication sessions, but instead work based on a selection by a contact center agent 131.

The Interactive Voice Response (IVR) system(s) 124 can be or may include any hardware coupled with software that can have a voice/video interaction with a customer. The IVR system(s) 124 may comprise various menus that allow a customer communication session to be directed to a specific contact center queue 122 or contact center pool 123.

The hold manager 125 can be or may include any software that can manage how a real-time communication session is placed on hold. The hold manager 125 can manage how real-time communication sessions are placed on hold by any of the contact center agents 131A-131N. In one embodiment, the hold manager 125 may be distributed between the contact center 120 and the agent terminals 130A-130N. Alternatively, the hold manager 125 may reside exclusively in individual agent terminals 130.

The training module 126 can be or may include any software that can manage and schedule training for the contact center agents 131A-131N. The training module 126 may work with a calendaring application (not shown) to automatically schedule training for a contact center agent 131.

The rule(s) 127 can be or may include any rule(s) 127 that can be used to determine how real-time communication sessions are managed. The rule(s) 127 may include rule(s) 127 for determining an estimated hold time, for determining how to handle a communication session when a real-time communication session is placed on hold longer than an estimated hold time, for managing any process for the contact center 120, and/or the like.

Figure 2:
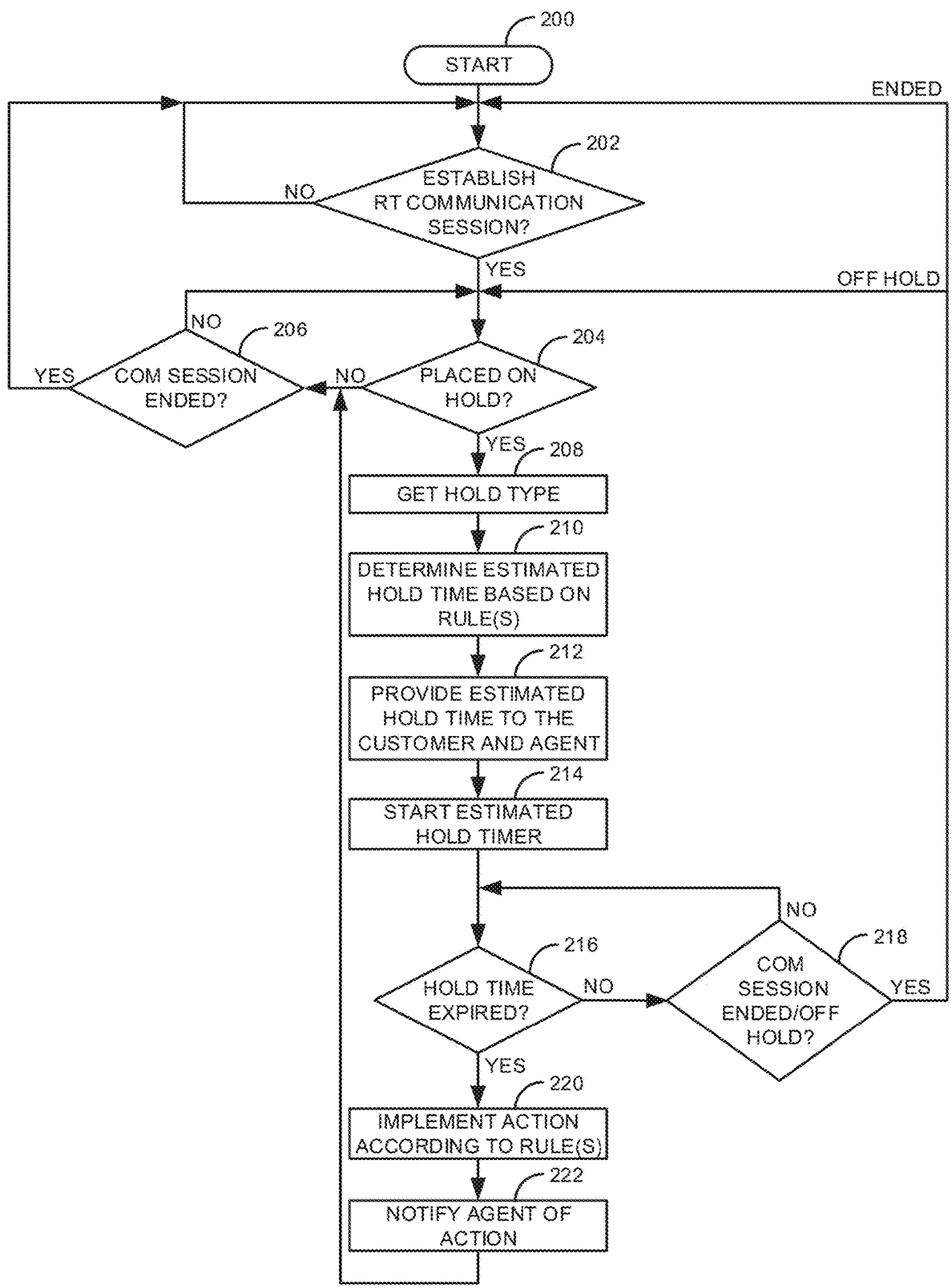
FIG. 2 is a flow diagram of a process for managing real-time communication session hold time in a contact center.
Figure 3:
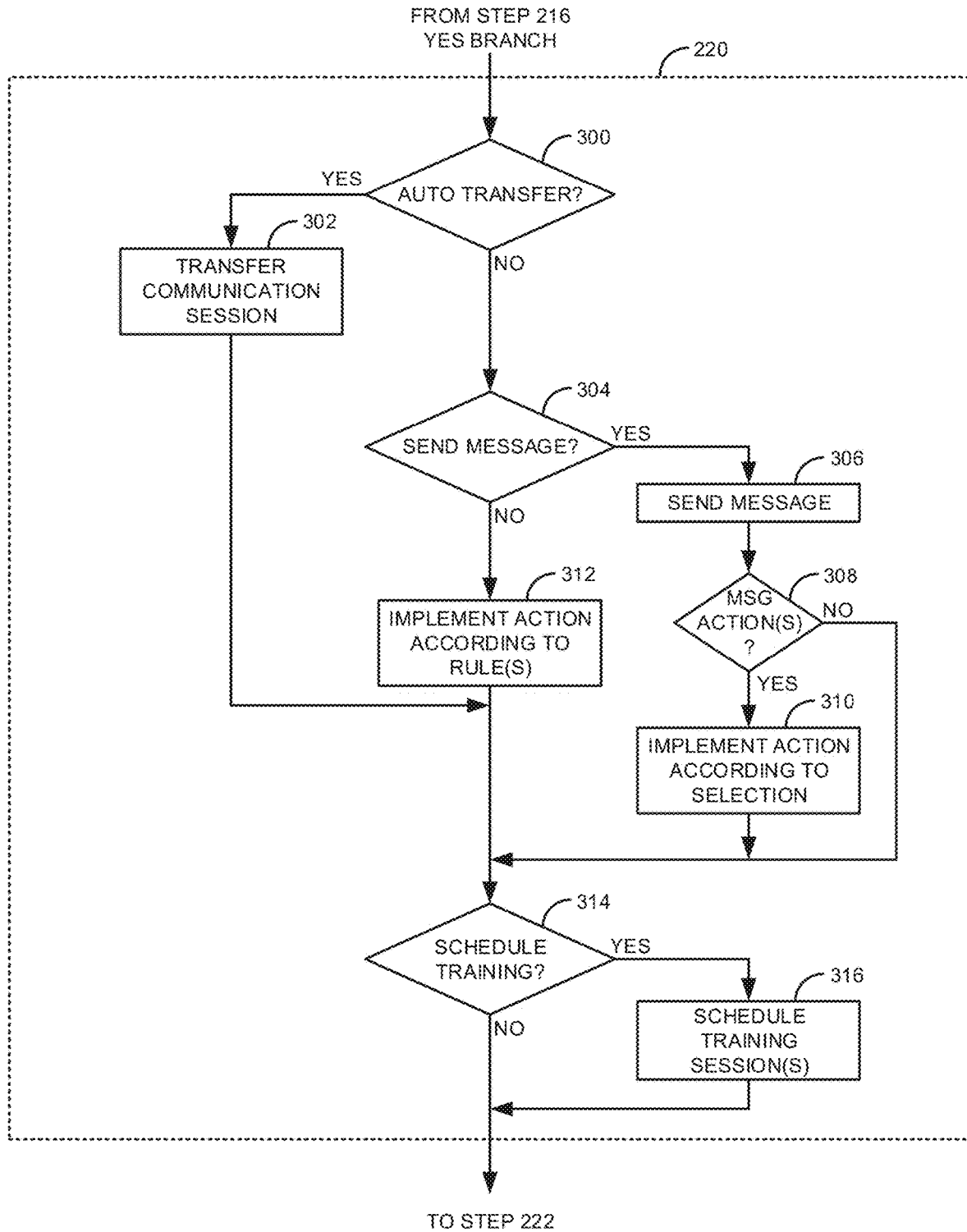
FIG. 3 is a flow diagram of a process for determining how to manage a real-time communication session when an estimated hold time has expired.
Figure 4:
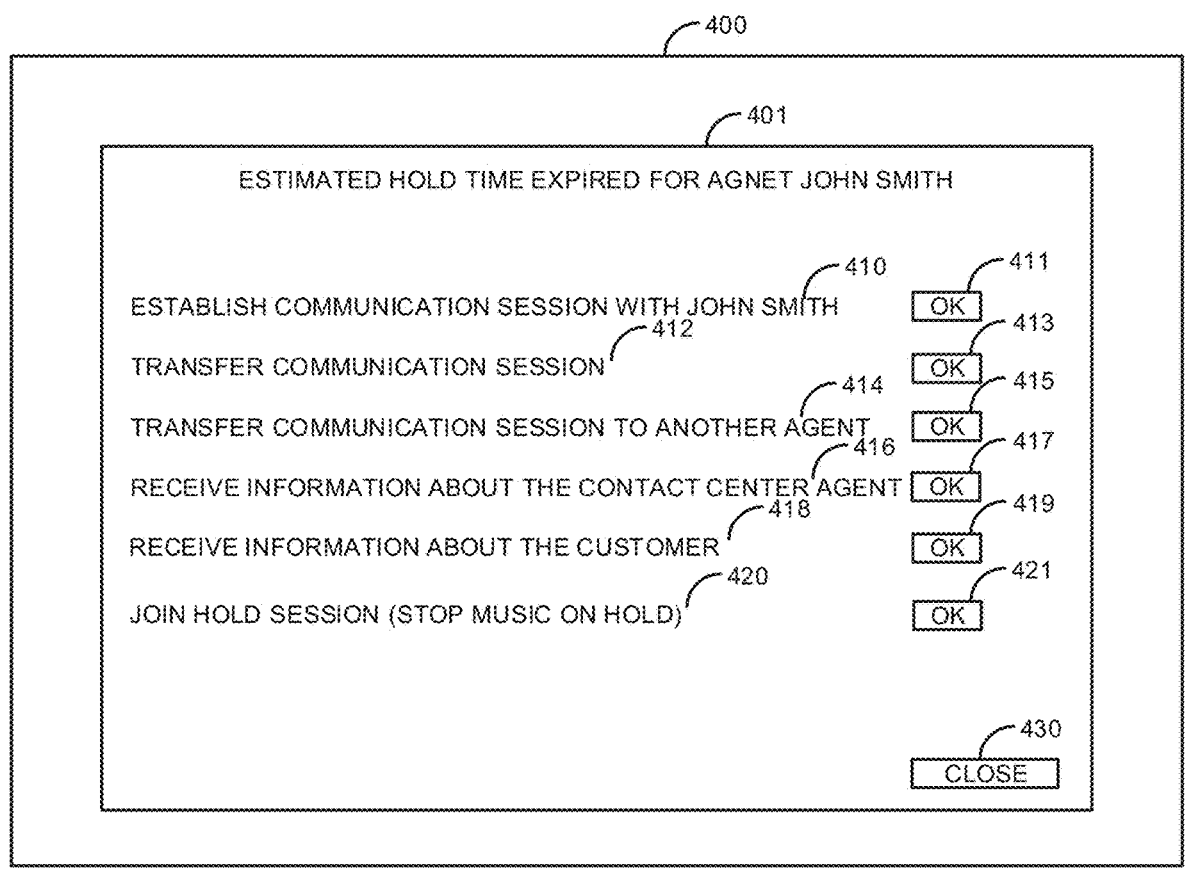
FIG. 4 is a diagram of a graphical user interface for managing a real-time communication session when an estimated hold time has expired.

FIG. 2 is a flow diagram of a process for managing real-time communication session hold time in a contact center 120. Illustratively, the customer communication endpoints 101A-101N, the contact center 120, the communication manager 121, the contact center queue(s) 122, the contact center pool(s) 123, the IVR system(s) 124, the hold manager 125, the training module 126, the rule(s) 127, and the agent terminals 130A-130N are stored-program-controlled entities, such as a computer or microprocessor, which performs the method of FIGS. 2-4 and the processes described herein by executing program instructions stored in a computer readable storage medium, such as a memory (i.e., a computer memory, a hard disk, and/or the like). Although the methods described in FIGS. 2-4 are shown in a specific order, one of skill in the art would recognize that the steps in FIGS. 2-4 may be implemented in different orders and/or be implemented in a multi-threaded environment. Moreover, various steps may be omitted or added based on implementation.

The process starts in step 200. The communication manager 121 determines, in step 202, if a real-time communication session has been established. For example, a real-time communication session may be established between the customer communication endpoint 101A and the agent terminal 130A. If a real-time communication session has not been established in step 202, the process of step 202 repeats. Otherwise, if a real-time communication session has been established in step 202, the hold manager 125 determines, in step 204, if the real-time communication session has been placed on hold. If the real-time communication session has not been placed on hold in step 204, the communication manager 121 determines, in step 206, if the real-time communication session has ended. If the real-time communication session has ended in step 206, the process goes back to step 202. Otherwise, if the real-time communication session has not ended in step 206, the process goes back to step 204.

If the real-time communication session has been placed on hold in step 204, the hold manager 125 gets a hold type in step 208. A hold type is a reason why the real-time communication session is being placed on hold. For example, a hold type may be where the contact center agent 131 is getting a manual/technical document, calling a technical specialist, sending an email, scheduling a call-back, doing research, consulting with a supervisor 131N, and/or the like. The hold type is typically used to determine an estimated hold time. For example, it usually takes less time to send an email than to do research on a technical problem. The hold type may be selected by the contact center agent 131. For example, the contact center agent 131 may use a menu displayed on the agent terminal 130 that has a list of hold types when placing the real-time communication session on hold.

In one embodiment, the hold manager 125 may automatically determine or suggest a hold type based on a conversation in the real-time communication session. For example, the hold manager 125 may determine that the hold type is for getting a manual because the customer stated that I do not have a manual.

The hold manager 125 determines, in step 210, an estimated hold time based on one or more rules 127. The estimated hold time may be based on various factors, such as, a hold time taken to resolve a similar real-time communication session (or multiple similar real-time communication sessions), a skill level of the contact center agent 131 that placed the real-time communication session on hold (e.g., the contact center agent 131 has three years' experience supporting product X), a prior amount of time the real-time communication session has been placed on hold by the contact center agent 131 (or multiple contact center agents 131 if the real-time communication session was transferred), a prior amount of time that that the real-time communication session has been placed on hold in at least one of a contact center queue 122 and a contact center pool 123, a prior amount of time that that a previous real-time communication session with the customer communication endpoint 101 was placed on hold, a type of customer associated with the customer communication endpoint 101 (e.g., is this a gold customer who does a lot of business with the contact center 120), and/or the like.

For example, the hold manager 125 may determine that the hold type (of step 208) is to get and send a technical document to the customer. Based on similar real-time communication sessions for this type of product it takes on average seventy second to get the technical document and send the email. In addition, a skill level of the contact center agent 131 (e.g., three years' experience (greater than average)) is also taken to account. Based on these rule(s) 127, the hold manager 125 determines the estimated hold time to be sixty seconds. In addition, the hold manager 125 may add some additional buffer time (e.g., ten second).

The hold manager 125 provides, in step 212, the estimated hold time to the customer and/or contact center agent 131. For example, the hold manager 125 may play a message in an audio stream of the real-time communication session that states the estimated hold time, stop music on hold in the real-time communication session to play the message in the audio stream of the first real-time communication that states the estimated hold time, insert, into a video stream of the first real-time communication session, a message that displays the estimated hold time (e.g., with a countdown time of the estimated wait time), insert into a chat stream of the first real-time communication session, a text message that states the estimated hold time, and/or the like.

The hold manager 125 starts a counter for the estimated hold time in step 214. The hold manager 125 determines, in step 216, if the estimated hold time has expired. If the estimated hold time has not expired in step 216, the hold manager 125 determines, in step 218, if the real-time communication session has ended or the real-time communication session has been taken off hold. If the real-time communication session has been taken of hold in step 218, the process goes to step 204. If the real-time communication session has ended in step 218, the process goes to step 202. Otherwise, if the real-time communication session has not ended or has not been taken of hold in step 218, the process goes back to step 216.

If the estimated hold time has expired in step 216, the hold manager 125 implements an action according to the rule(s) 127. For example, the real-time communication session may be automatically transferred to the agent terminal 130N so that the supervisor 131N can talk to the customer. The contact center agent 131 is then notified of the action in step 222. The process then goes back to step 206 to see if the communication session has ended.

FIG. 3 is a flow diagram of a process for determining how to manage a real-time communication session when an estimated hold time has expired. The process of FIG. 3 is an exemplary embodiment of step 220 of FIG. 2. After the estimated hold time has expired in step 216, the hold manager 125 determines, in step 300, if the rule(s) 127 (e.g., based on one or more factors) require that the real-time communication session be automatically transferred. If the rule(s) 127 require that the real-time communication session be automatically transferred in step 300, the communication manager 121 transfers the real-time communication session in step 302 and the process goes to step 314.

For example, if the contact center agent 131 is consistently failing to meet the estimated hold time (e.g., based on exceeding a percentage/number of real-time communication sessions where the estimated hold time expired), the rule 127 may require that the real-time communication session be automatically transferred to the agent terminal 130N so that the supervisor 131N can handle the real-time communication session. Based on the rule(s) 127, the real-time communication session may be transferred to any one of the agent terminals 130A-130N, to a contact center queue 122, to a contact center pool 123, to an IVR system 124, and/or the like.

If the rule(s) 127 do not require the real-time communication session to be automatically transferred in step 300, the hold manager 125 determines, in step 304, whether to send a message based on the rule(s) 127. For example, the hold manager 125 may send a message (e.g., as part of a web page) to the agent terminal 130N of the supervisor 131N. Alternatively, the message may be sent to the agent terminal 130 of the contact center agent 131 that placed the real-time communication session on hold. For example, the message may require that the contact center agent 131 enter an estimated time until the contact center agent 131 will take the real-time communication session off hold.

If the message is to be sent in step 304, the hold manager 125 sends, in step 306, the message (e.g., message 401 as shown in FIG. 4). The hold manager 125 determines if there is a selected action(s) associated with the message. For example, the supervisor 131N may select an option to call the contact center agent 131 who placed the real-time communication session on hold to discuss why the contact center agent 131 exceed the estimated hold time. If no action is selected or the message does not allow a selected action, in step 308, the process goes to step 314. Otherwise, if an action(s) is selected in step 308 (e.g., to call the contact center agent 131) the action is implemented according to the selection in step 310 and the process goes to step 314.

If the rule(s) 127 do not define sending a message in step 304, the hold manage 125 may implement another action in step 312. The other action of step may be any action that can be defined under the rules 127. For example, a message may be played to the customer indicating that the contact center agent 131 needs additional time to complete the action.

The training module 126 determines, in step 314, if the rule(s) 127 require that the contact center agent 131 be scheduled for additional training. If the training module 126 determines, in step 314, that the contact center agent 131 needs additional training, the training module 126 schedules, in step 316, one or more training sessions for the contact center agent 131. For example, if the contact center agent 131 keeps taking too long to resolve a technical problem for product X, the training module 126 may determine, in step 314, to automatically schedule the contact center agent 131 in a training session for project X. The process then goes to step 222. Otherwise, if the training module 126 determines in step 314 that no training should be scheduled, the process goes to step 222.

In one embodiment the scheduling of the one or more training sessions may be based on approval from the supervisor 131N. For example, a message may be sent to the supervisor 131N to approve the training session(s).

FIG. 4 is a diagram of a graphical user interface 400 for managing a real-time communication session when an estimated hold time has expired. The graphical user interface 400 comprises a message 401. The message 401 is an exemplary message that is sent to the supervisor 131N (or other contact center agent 131) in step 306 when the estimated hold time has expired.

The message 401 comprises a list of selectable actions 410, 412, 414, 416, 418, and 420. The selectable action 410 allows the supervisor 131N to establish a communication session (e.g., a voice call) to see why the contact center agent 131 John Smith exceed the estimated hold time. The selectable action 412 allows the supervisor 131N to transfer the real-time communication session to the agent terminal 130N. The selectable action 414 allows the supervisor 131N to transfer the real-time communication to another contact center agent 131. For example, the supervisor 131N may transfer the communication session to a technical specialist (a contact center agent 131). The selectable action 416 allows the supervisor 131N to receive information about the contact center agent 131 that placed the real-time communication session on hold. The selectable action 418 allows the supervisor 131 to receive information about the customer who is on the real-time communication session. The selectable action 420 allows the supervisor 131N to join the real-time communication and stop music on hold. This allows the supervisor 131N to talk with the customer until the contact center agent 131 takes the real-time communication session off hold.

The okay buttons 411, 413, 415, 417, 419, and 421 allow the supervisor 131N to select the respective selectable actions 410, 412, 414, 416, 418, and 420. For example, if the supervisor wants to transfer the real-time communication to another contact center agent 131 using selectable action 414, the supervisor 131N would select the okay button 415. If the supervisor 131N wants to close the message 401, the supervision 131N can select the close button 430.

As one of skill in the art would recognize, more than a single selectable action 410, 412, 414, 416, 418, and 420 may selected (in various combinations) by the supervisor 131N. For example, the supervisor 131N may select the action 418 to receive information about the customer. Based on the received information about the customer, the supervisor 131N can the join into the real-time communication session and stop the music on hold by selecting the selectable action 420.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments®

Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network 110, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device (s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
    a microprocessor; and
    a computer readable medium, coupled with the microprocessor and comprising microprocessor readable and executable instructions that, when executed by the microprocessor, cause the microprocessor to:
        determine that a first real-time communication session between a first agent terminal and a customer communication endpoint has been placed on hold by a first contact center agent;
        in response to determining that the first real-time communication session has been placed on hold, determine, based on a rule, an estimated hold time for the first real-time communication session;
        determine that the estimated hold time for the first real-time communication session has expired; and
        in response to determining that the estimated hold time for the first real-time communication session has expired, at least one of:
            automatically transfer the first real-time communication session to a second agent terminal;
            send a first message to the first agent terminal to have the first contact center agent provide an estimated time before the first real-time communication session is taken off hold;
            send a second message to the second agent terminal that notifies a second agent associated with the second agent terminal that the estimated hold time has expired; and
            scheduling a training session for the first contact center agent.

2. The system of claim 1, wherein rule identifies a hold type, and wherein the hold type determines the estimated hold time.

3. The system of claim 1, wherein the hold type is selected by the first contact center agent.

4. The system of claim 3, wherein the first contact center agent selects the hold type from a list of hold types when the first real-time communication session was placed on hold.

5. The system of claim 1, wherein the microprocessor readable and executable instructions further cause the microprocessor to automatically determine a hold type, and wherein the hold type determines the estimated hold time.

6. The system of claim 1, wherein the microprocessor readable and executable instructions further cause the microprocessor to suggest a hold type, wherein the hold type is one of multiple hold types, and wherein the rule is based at least one of the multiple hold types.

7. The system of claim 1, wherein the rule is based on a hold type, and wherein the hold type is suggested, by the microprocessor, to the first contact center agent, and wherein the hold type is associated with a hold time taken to resolve a similar real-time communication session.

8. The system of claim 1, wherein the microprocessor readable and executable instructions cause the microprocessor to at least one of:
    play a third message in an audio stream of the first real-time communication session that states the estimated hold time;
    stop music on hold in the first real-time communication session to play the third message in the audio stream of the first real-time communication session that states the estimated hold time;
    insert, into a video stream of the first real-time communication session, a fourth message that displays the estimated hold time; and
    insert into a chat stream of the first real-time communication session, a text message that states the estimated hold time.

9. The system of claim 1, wherein the microprocessor readable and executable instructions cause the microprocessor to at receive a selection, via a graphical user interface, that identifies a type of action to be taken by the first contact center agent, where the identified type of action is used to determine the estimated hold time.

10. The system of claim 1, wherein the training session is scheduled for the first contact center agent.

11. A method comprising:
    determining, by a microprocessor, that a first real-time communication session between a first agent terminal and a customer communication endpoint has been placed on hold by a first contact center agent;
    in response to determining that the first real-time communication session has been placed on hold, determining, by the microprocessor and based on a rule, an estimated hold time for the first real-time communication session;
    determining, by the microprocessor, that the estimated hold time for the first real-time communication session has expired; and
    in response to determining that the estimated hold time for the first real-time communication session has expired, at least one of:
        automatically transfer the first real-time communication session to a second agent terminal;

send a first message to the first agent terminal to have the first contact center agent provide an estimated time before the first real-time communication session is taken off hold;

send a second message to the second agent terminal that notifies a second agent associated with the second agent terminal that the estimated hold time has expired; and scheduling a training session for the first contact center agent.

12. The method of claim 11, wherein the first real-time communication session is automatically transferred to the second agent terminal.

13. The method of claim 11, wherein the second message is sent to the second agent terminal.

14. The method of claim 13, wherein the second message sent to the second agent terminal allows the second agent to at least one of: establish a second real-time communication session between the first agent terminal and the second agent terminal, have the first real-time communication session transferred to the second agent terminal, have the first real-time communication session transferred to a third agent terminal, receive information about the first contact center agent, receive information about a user of the customer communication endpoint, and take music off hold and join the first real-time communication session.

15. The method of claim 11, wherein the first message is sent to the first agent terminal to have the first contact center agent provide the estimated time before the first real-time communication session is taken off hold.

16. The method of claim 11, wherein the rule is based on at least one of:

a hold time taken to resolve a similar real-time communication session;

a skill level of the first contact center agent;

a prior amount of time the first real-time communication session has been placed on hold by the first contact center agent;

a prior amount of time that that the first real-time communication session has been placed on hold in at least one of a contact center queue and a contact center pool;

a prior amount of time that a previous real-time communication session with the customer communication endpoint was placed on hold; and a type of customer associated with the customer communication endpoint.

17. The method of claim 16, wherein the rule is based on the hold time taken to resolve the similar real-time communication session and the skill level of the first contact center agent.

18. The method of claim 11, wherein the microprocessor readable and executable instructions cause the microprocessor to at least one of:

play a third message in an audio stream of the first real-time communication session that states the estimated hold time;

stop music on hold in the first real-time communication session to play the third message in the audio stream of the first real-time communication session that states the estimated hold time;

insert, into a video stream of the first real-time communication session, a fourth message that displays the estimated hold time; and insert into a chat stream of the first real-time communication session, a text message that states the estimated hold time.

19. The method of claim 11, wherein the training session is scheduled for the first contact center agent.

20. A non-transient computer readable medium having stored thereon instructions that cause a microprocessor to execute a method, the method comprising instructions to:

determine that a first real-time communication session between a first agent terminal and a customer communication endpoint has been placed on hold by a first contact center agent;

determine, based on a rule, an estimated hold time for the first real-time communication session in response to determining that the first real-time communication session has been placed on hold;

determine that the estimated hold time for the first real-time communication session has expired; and in response to determining that the estimated hold time for the first real-time communication session has expired, at least one of:

automatically transfer the first real-time communication session to a second agent terminal;

send a first message to the first agent terminal to have the first contact center agent provide an estimated time before the first real-time communication session is taken off hold;

send a second message to the second agent terminal that notifies a second agent associated with the second agent terminal that the estimated hold time has expired; and scheduling a training session for the first contact center agent.

* * * * *

UNITED STATES PATENT AND TRADEMARK OFFICE
CERTIFICATE OF CORRECTION

PATENT NO. : 11,076,045 B2  
APPLICATION NO. : 16/249571  
DATED : July 27, 2021  
INVENTOR(S) : Niraj Riswadkar, Salil Dhawan and Mayura Nene It is certified that error appears in the above-identified patent and that said Letters Patent is hereby corrected as shown below:

In the Claims

Column 12, Line 6, please delete "1" and insert --2-- therein.

Signed and Sealed this  
Twenty-first Day of September, 2021

Drew Hirshfeld  
*Performing the Functions and Duties of the*  
*Under Secretary of Commerce for Intellectual Property and*  
*Director of the United States Patent and Trademark Office*